Patented Aug. 15, 1950

2,518,444

UNITED STATES PATENT OFFICE 2,518,444

MANUFACTURE AND APPLICATION OF NEW TEXTILE TREATMENT AGENTS

William Baird, Thomas Barr, Arthur Lowe, and Jack Oliver, Blackley, Manchester, England, assignors to Imperial Chemical Industries Limited, a corporation of Great Britain No Drawing. Application July 28, 1947, Serial No. 764,258. In Great Britain August 14, 1946

15 Claims. (Cl. 260—404.5)

1

This invention relates to the manufacture of new chemical compounds and to their use in treating textile materials, especially for the purpose of conferring anti-shrink properties on wool.

According to the present invention we manufacture new chemical compounds of the formula $R(O.CO.NR'\text{-}CH_2OR'')_n$ where R stands for an aliphatic radical, substituted or not, R' stands for hydrogen or an organic residue, R'' stands for hydrogen or an alkyl radical and $n$ stands for a whole number greater than 1, from polycarbamates of the formula $R(O\text{-}CO\text{-}NHR')_n$ by the processes hereinafter set forth.

The polycarbamates which are used as starting materials are derivatives of compounds of the formula $R(OH)_n$ wherein R and $n$ have the significance stated above. They may conveniently be made by treating the compound $R(OH)_n$ with phosgene and by treating the so-obtained chloroformic ester with ammonia or with a primary amine.

As suitable compounds and mixtures of compounds of the formula $R(OH)_n$ for making the polycarbamates there may be mentioned, for example, ethylene glycol, octadecane-1:12-diol, castor oil, hydrogenated castor oil, glycerol N:N'-ethylene-bis-ricinoleamide and dibenzoylmannitol.

Thus as suitable polycarbamates to be used in the processes of this invention there may be mentioned, for example, ethylene bis-carbamate, octadecane-1:12-diol bis-carbamate, triolein-11:11':11''-triol triscarbamate and tristearin-11:11':11''-triol triscarbamate.

In carrying the invention into practical effect the polycarbamates are mixed with formaldehyde (or with a polymer thereof), advantageously at slightly elevated temperature, for example at 40–60° C., optionally in the presence of a solvent or diluent, either under alkaline conditions, whereby the new compounds formed have the formula stated above wherein R'' is hydrogen, or under slightly acid conditions in the presence of an alcohol, whereby the new compounds formed have the formula stated above wherein R'' is an alkyl radical.

The new compounds, having the formula stated, wherein R'' is an alkyl radical may also be made by mixing the halogenomethyl derivative of the polycarbamate (obtainable for example by treatment of the polycarbamate with formaldehyde and a hydrogen halide) with an alcohol, advantageously at slightly elevated temperatures, for example at 40–60° C. or by mixing the hydroxymethyl derivative of the polycar-

2 bamate with an alcohol under slightly acid conditions advantageously at slightly elevated temperatures, for example at 40–60° C.

Suitable alcohols for use in the above processes are for example, methyl, ethyl and propyl alcohols, glycol and glycollic acid.

The new compounds are soluble or readily dispersible in water and are soluble in organic solvents such as alcohols, acetone, benzene, toluene, chloroform, ethylene dichloride and dioxan. When the compounds are heated above 100° C. under acid conditions they decompose, forming water-insoluble resinous substances.

By a further feature of the invention the new compounds are applied to textile materials which may be of animal or vegetable origin or composed of regenerated cellulose or of cellulose esters or ethers to give them improved properties including shrink-resistance and/or water-repellency. This feature of the invention comprises impregnating the said textile materials with a solution or suspension of one or more of the new compounds in water or in a suitable organic liquid, at a convenient temperature, for example at a temperature below 160° C., and subsequently drying the impregnated material and heating under acid conditions to such a temperature that the said new compounds undergo decomposition, for example to a temperature of about 150° C. Acid conditions may be produced by the direct addition of acids themselves or by means of salts of bases which liberate acids on heating e. g. pyridine hydrochloride or hydrobromide or by means of heat decomposable quaternary compounds such as cetoxymethylpyridinium chloride, stearamidomethylpyridinium chloride.

Dispersing agents may be used in the preparation of the impregnating fluid, for example the condensation product of cetyl alcohol with 17 molecular proportions of ethylene oxide.

Other textile finishing agents may also be added to the impregnating fluid. Thus, for example, polyvalent metal salts, for example aluminium acetate or water-repellent waxes, for example paraffin wax, montan wax, carnauba wax and beeswax, may be added in order to improve the water-repellent properties of the textile materials.

By a further feature of the invention the new compounds may be applied in conjunction with compounds which are used to confer crease-resistant properties on textile materials, for example, condensation products of formaldehyde with phenols or with urea or urea derivatives, the two treatment agents being applied either separately or simultaneously, i. e. from the same bath.

The invention is illustrated but not limited by the following examples in which parts and percentages are by weight.

Example 1

To a solution of 100 parts of the polycarbamates obtained by treating hydrogenated castor oil with phosgene and then with ammonia, consisting essentially of tristearin-11:11′:11″-triol tris-carbamate in 240 parts of benzene, 10 parts of paraformaldehyde and 20 parts of anhydrous potassium carbonate are added. The mixture is stirred at a temperature of 50–60° C. for 2–3 hours and then filtered. The filtrate is evaporated at 45–50° C. under reduced pressure whereby the methylol derivative is obtained as a pale yellow viscous liquid.

Example 2

To a solution of 57 parts of the polycarbamates obtained by treating castor oil with phosgene and then with ammonia, consisting essentially of triolein-11:11′:11″-triol tris-carbamate in 120 parts of benzene, 11.4 parts of anhydrous potassium carbonate and 5.7 parts of paraformaldehyde are added. The mixture is stirred at 45–50° C. for 2 hours and then filtered. The filtrate is concentrated by evaporation under reduced pressure at 50–60° C. whereby the methylol derivative is obtained as a clear viscous oil.

Example 3

1 part of the condensation product of cetyl alcohol with 17 molecular proportions of ethylene oxide is dissolved in 20 parts of the product of Example 1 and the mixture is emulsified with 79 parts of water. 100 parts of 1.5 N hydrochloric acid are then added with stirring to the emulsion and a light weight wool flannel is then padded in the resultant dispersion, squeezed between rubber rollers to an uptake of approximately 100%, dried at 50° C. and subsequently baked at 145° C. for 3 minutes. The pattern thus prepared is milled by hand for 15 minutes in 5% soap solution in comparison with an untreated pattern and shows an area shrinkage of 11.2% in comparison with 31.9% for the untreated material.

Example 4

1 part of the condensation product of cetyl alcohol with 17 molecular proportions of ethylene oxide is dissolved in 20 parts of the product of Example 2 and the mixture is emulsified with 79 parts of water. 100 parts of 2 N hydrochloric acid are then added with stirring to the emulsion and a light weight wool flannel is padded in the resultant dispersion, squeezed between rubber rollers to an uptake of approximately 100%, dried at 50° C. and subsequently baked at 145° C. for 3 minutes. The pattern thus prepared when milled by hand in 5% soap solution for 15 minutes shows an area shrinkage of 2.5% in comparison with 30.1% for the untreated material.

Example 5

60 parts of ethylene bis-carbamate are dissolved in a mixture of 550 parts of water and 75 parts of 37% formaldehyde solution. 5 parts of potassium carbonate are added and the mixture is stirred at 50° C. for 2 hours. Further additions of potassium carbonate are made from time to time to keep the mixture alkaline to phenolphthalein. The solvent is then removed by evaporation under reduced pressure at 40° C. leaving ethylene bis-hydroxymethylcarbamate as a stiff gum.

Example 6

10 parts of the methylol derivatives (obtainable as described in Example 1) of the mixture of polycarbamates obtained by treating hydrogenated castor oil with phosgene and then ammonia are dissolved in 200 parts of ethanol and a slow stream of gaseous hydrogen chloride is passed into the solution for 10 minutes. The solution is stirred at 50–60° C. for 2 hours and then neutralised by adding potassium carbonate. The mixture is filtered and the solvent is removed by evaporation under reduced pressure at 50–60° C. whereby the ethoxymethylcarbamate derivative is obtained as a clear mobile liquid.

Example 7

80 parts of the chloromethyl derivatives of the polycarbamates obtained by treating castor oil with phosgene and then with ammonia consisting essentially of triolein-11:11′:11″-triol-tris-chloromethylcarbamate are added with stirring during 1 hour to 400 parts of n-butyl alcohol at room temperature. The mixture is heated at 45–50° C. for 4 hours and is then neutralised by the addition of anhydrous potassium carbonate. The mixture is filtered and the solvent is removed by evaporation under reduced pressure at 50–60° C. whereby the butoxymethyl carbamate derivative is obtained as a clear mobile oil.

Example 8

80 parts of the chloromethyl derivatives of Example 1 are added with stirring during 1 hour to 400 parts of ethyl alcohol at room temperature. The mixture is heated at 50–60° C. for 8 hours and is then neutralised by the addition of anhydrous sodium carbonate. The mixture is filtered and the solvent is removed from the filtrate by evaporation under reduced pressure at 60° C. whereby the ethoxymethyl derivative is obtained as a clear mobile oil.

Example 9

10 parts of the methylol derivative of the polycarbamates obtained by treating hydrogenated castor oil with phosgene and then with ammonia consisting essentially of tristearin-11:11′:11″-triol-tris-methylolcarbamate are dissolved in 200 parts of methanol and a slow stream of gaseous hydrogen chloride is passed through the mixture for 10 minutes. The mixture is then heated to 50° C. and stirred at this temperature for 2 hours. It is then neutralised with anhydrous sodium carbonate, filtered, and the filtrates are concentrated by evaporation under reduced pressure at 50° C. whereby the methoxymethyl derivative is obtained as a clear mobile oil.

We claim:

1. As a new compound, tristerin-11:11′:11″-triol tris-methylolcarbomate.

2. As a new compound, triolein-11:11′:11″-triol-tris-methylolcarbamate.

3. New chemical compounds of the formula R(OCONHCH$_2$OR″)$_3$ wherein R represents the aliphatic radical of a glyceryl compound selected from the group consisting of castor oil and hydrogenated castor oil and R″ is selected from the group consisting of hydrogen and alkane radicals of from one to four carbon atoms.

4. A process for the production of anti-shrinking compounds which comprises reacting a tris-carbamate selected from the group consisting of triolein–11:11′:11″–triol-tris-carbamate and tristearin–11:–11′:11″–triol-tris-carbamate with an aldehyde selected from the group consisting of formaldehyde and paraformaldehyde.

5. A process as claimed in claim 4 wherein said triscarbamate is tristearin–11:11′:11″ triol-triscarbamate.

6. A process as claimed in claim 4 wherein said triscarbamate is triolein–11:11′:11″–triol-triscarbamate.

7. A process as claimed in claim 4 wherein the reaction is carried out at a temperature of between 40° C. and 60° C.

8. A process as claimed in claim 4 wherein the reaction is carried out in the presence of an inert solvent.

9. A process as claimed in claim 4 wherein the reaction is carried out under alkaline conditions.

10. A process as claimed in claim 4 wherein the reaction is carried out under acidic conditions in the presence of a saturated aliphatic alcohol of from 1 to 4 carbon atoms.

11. A process for increasing the shrink-resistance of textiles which comprises impregnating the textile material with an acidic emulsion of a compound having the formula $$R(OCONHCH_2OR'')_3$$

wherein R represents the aliphatic radical of a glyceryl compound selected from the group consisting of castor oil and hydrogenated castor oil and R″ is selected from the group consisting of hydrogen and alkane radicals of from one to four carbon atoms, and subsequently heating the thus treated textile material to decompose said compound.

12. A process as claimed in claim 11 wherein said acidic emulsion contains a dispersing agent.

13. A process as claimed in claim 11 wherein said compound is tristearin–11:11′:11″–triol trismethylol carbamate.

14. A process as claimed in claim 11 wherein said compound is triolein–11:11′:11″–triol trismethylol carbamate.

15. A proces as claimed in claim 11 wherein the heating is carried out at a temperature of about 145°C.

WILLIAM BAIRD.
THOMAS BARR.
ARTHUR LOWE.
JACK OLIVER.

REFERENCES CITED

The following references are of record in the file of this patent:

FOREIGN PATENTS

| Number | Country | Date |
|--------|---------|------|
| 876,390 | France | Aug. 3, 1942 |